Sept. 1, 1925.

C. MacHARG 1,552,000

REENFORCED BED SPRING

Filed July 3, 1924   2 Sheets-Sheet 1

Inventor:
Carlyle MacHarg
by Wm. F. Freudenreich
Atty.

Sept. 1, 1925.                                                    1,552,000
C. MacHARG
REENFORCED BED SPRING
Filed July 3, 1924           2 Sheets-Sheet 2
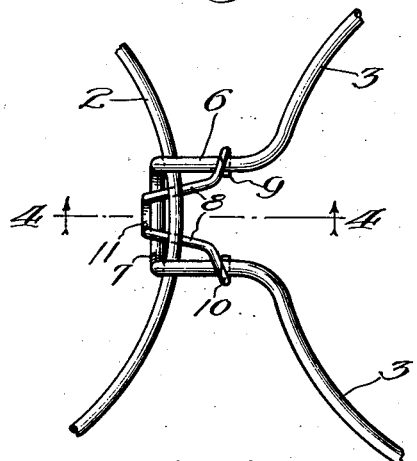
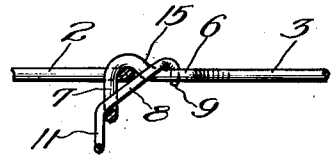
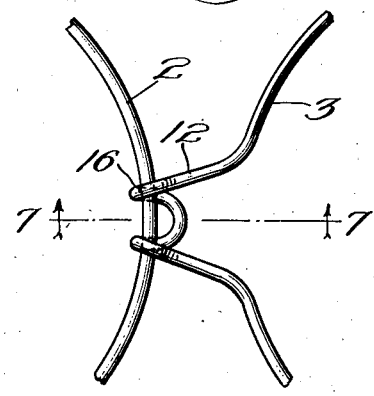
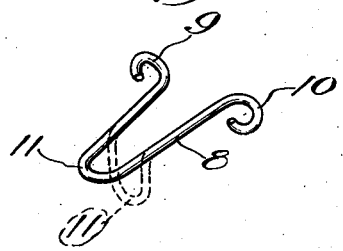
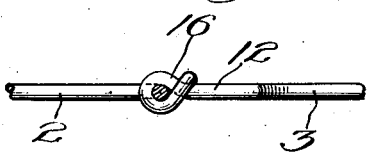
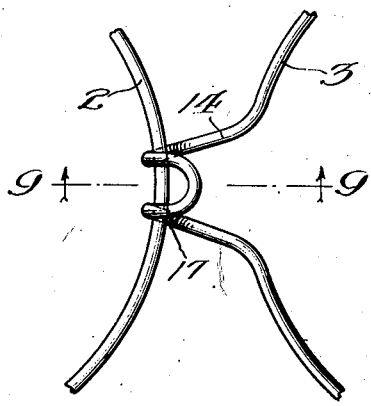
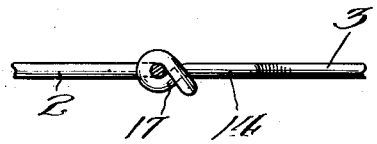
Inventor:
Carlyle MacHarg,
by Wm. F. Freudenreich, Atty.

Patented Sept. 1, 1925.

1,552,000

UNITED STATES PATENT OFFICE.

CARLYLE MacHARG, OF HINSDALE, ILLINOIS, ASSIGNOR TO KINNEY ROME COMPANY, A CORPORATION OF ILLINOIS.

REENFORCED BED SPRING.

Application filed July 3, 1924. Serial No. 723,908.

*To all whom it may concern:*

Be it known that I, CARLYLE MACHARG, a citizen of the United States, residing in Hinsdale, county of Du Page, State of Illinois, have invented a certain new and useful Improvement in Reenforced Bed Springs, and declare the following to be a full, clear, and exact description of the same, such as will enable others skilled in the art to which it pertains to make and use the same, reference being had to the accompanying drawings, which form a part of this specification.

A very common form of bed spring is one in which the spring body is composed of many coiled springs arranged vertically side by side in rows, the upper convolutions of the springs being cross connected from one spring to another by means of small coiled springs that tend to hold the main springs upright and yet permit them to yield freely. One objection to bed springs of this kind is that they yield too readily under a lateral pressure against the edge thereof, even when the upper convolutions of the outermost springs are connected to a light frame extending entirely around the structure.

An object of the present invention is to improve bed springs of this general type so as to make them more resistant to lateral pressure against the edges, without detracting from the yielding characteristic of the structure under pressures in the vertical direction.

In carrying out my invention I brace the marginal portions of the structure by fastening the upper convolutions of the outermost line of springs to the adjacent inner springs, namely to the springs of the next inner line or row.

Therefore, viewed in one of its aspects, my invention may be said to have for its object to produce a simple and novel means for connecting corresponding convolutions of two springs in such a way as to prevent relative movements of such convolutions from or toward each other in the plane thereof, while permitting relative movements out of said plane.

Figure 1:
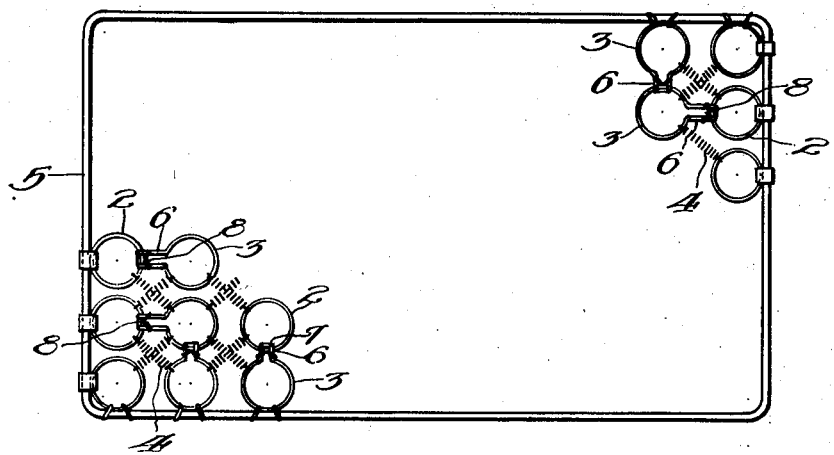
Figure 2:
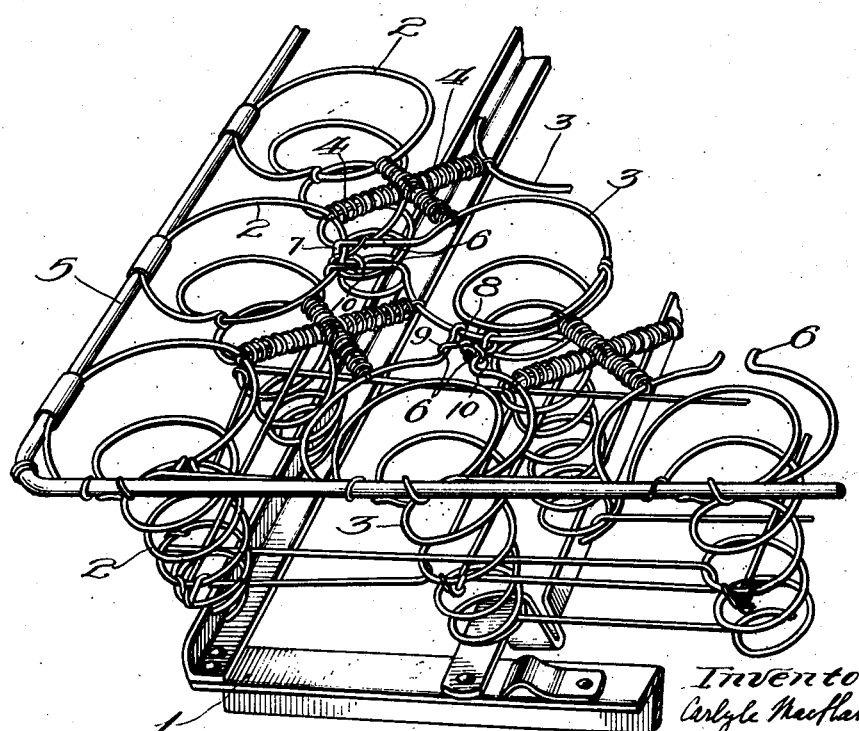

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a plan view of a bed spring arranged in accordance with my invention, only fragments of the spring element or body being shown; Fig. 2 is a perspective view, on a larger scale than Fig. 1, showing one corner of my improved spring; Fig. 3 is a top plan view, on a still larger scale, of the preferred means of attaching the upper convolution of an outer spring to the upper convolution of an inner spring; Fig. 4 is a section taken approximately on line 4—4 of Fig. 3; Fig. 5 is a perspective view of the locking clip shown in Figs. 3 and 4, the dotted line showing the bent position of the looped end of the clip in the completed bed spring; Fig. 6 is a view similar to Fig. 3 showing a modified connection; Fig. 7 is a section taken approximately on line 7—7 of Fig. 6; Fig. 8 is a view similar to Figs. 3 and 6 showing a still further modification; and Fig. 9 is a section taken approximately on line 9—9 of Fig. 8.

Referring to the drawings, 1 represents a base or frame of any usual or suitable construction on which are set vertical coiled springs 2 and 3, also of any usual or suitable construction, those illustrated being of the type in which the convolutions increase in diameter from the bottom toward the top.

In the space bounded by each group of four springs are placed small cross springs 4, there being two of such cross springs arranged in right angles to each other in each such space; each spring extending between and being connected with the upper convolutions of two of the main springs. Extending around the upper portion of the spring body is a light frame 5 that is fastened in any suitable way to the upper convolutions of the outermost springs. The construction as described up to this point is old and well known and, while my invention is most advantageously applied to this particular form and arrangement, it is also suitable for use in other types of bed springs or the like.

When a lateral pressure is exerted at any point on the light frame in a structure of the kind heretofore described, there is very little resistance to inward deflection, and this is an objectionable feature.

I have found that if each of the outermost springs, excepting perhaps those at the four corners of a rectangular structure where there is inherent rigidity, has its upper convolution connected to the adjacent spring of the next inner row by a stiff tie or strut, so that the upper convolutions of any outer spring and the corresponding inner spring must move in unison in the plane of those convolutions, any lateral pressure on the light frame 5 is distributed and resisted so as to overcome the objection of unduly large deflection. These reenforced connections can conveniently be made by bending the upper convolution of one of the two springs to produce a radially-projecting arm whose free end is then securely fastened to the upper convolution of the other of the two springs. The arm may be a part of either the outer spring or the inner spring; and, for the sake of illustrating both arrangements, I have shown them both in Fig. 2.

The details of the special connection between the springs of the two outer rows, in its preferred form, are best shown in Figs. 3 to 5. Referring to these figures, in which 2 and 3 are the springs, the upper convolution of the spring 3 has a part 6 bent laterally to form a short U-shaped arm, the outer looped end being bent downwardly as indicated at 7. This arm is laid upon the upper convolution of the spring 2, with the depending portion 7 bearing against the inner side of said convolution. The two springs are then fastened together by means of a U-shaped clip 8 having at the free ends of its arms hooks 9 and 10 that lie in a plane transverse to the length of the clip and are preferably arcs of a circle somewhat longer than 180 degrees; the internal diameter of the hooks being the same as that of the wire of which the main springs are made. When two springs are to be fastened together, the clip is inserted between the two side members of the arm 6, with its looped end down, underneath the wire of the upper convolution of the spring 2 and through the depending looped end 7. The hooks 9 and 10 overlie the horizontal portions of the side members of the arm 6 and may be sprung upon these side members so as partially to surround the latter. The inner end of the clip is then bent down, as indicated at 11 in dotted lines in Fig. 5, and in full lines at Fig. 4. As the end of the clip 11 is bent down the hooks are drawn laterally as far as they can go, so that a secure tie between the arm 6 and the upper convolution of the spring 2 is obtained.

If desired, the fastening of the arm on one spring to the other spring may be effected without a clip. Thus in Figs. 6 and 7 there is shown an arm 12 which is V-shaped, rather than U-shaped. This arm is made long enough so that when it is laid upon the upper convolution of the spring 2, it may be bent underneath the same and then up so that the wire of the upper convolution of the spring is completely encircled. By making the arm 12 V-shaped, the narrower closed end is free to pass up between the side members of the arm.

In Figs. 8 and 9 there is shown an arm 14, similar to the arm 12; but, instead of passing this arm above the upper convolution of the spring 2, I pass it underneath the same, and then bend the closed free end upwardly across the top of the upper convolution and then down between the side members of the horizontal portion of the arm.

The arms in each case are preferably given a jog in the vertical direction so as to permit the upper convolutions of the two springs to lie in the same horizontal plane when fastened together. In the arrangement shown in Figs. 3 and 4 this jog, indicated at 15, is in the upward direction, as is also the jog 16 in Fig. 7. In Fig. 9, since the arm passes underneath the wire of the upper convolution of spring 2, the jog 17 is in the downward direction.

While I have illustrated and described with particularity only a single form of my invention, with slight modifications, I do not desire to be limited to the exact structural details thus illustrated and described; but intend to cover all forms and arrangements that come within the definitions of my invention constituting the appended claims.

I claim:

1. In a bed spring, a body composed of vertical coiled springs arranged side by side and consisting of an outer line of springs surrounding the remainder thereof, and connections between the springs of the outer line and all of the adjacent inner springs, each of said connections consisting of a stiff arm integral with the upper convolution of one spring and fastened at its free end to the upper convolution of the other spring.

2. In a bed spring, a rectangular body composed of vertical coiled springs arranged side by side, a light frame surrounding said body in about the plane of and attached to the upper convolutions of the outer springs, and connections between the outer springs on each side of the rectangle and the adjacent inner springs, each of said connections consisting of an arm integral with the upper convolution of one spring and fastened to the upper convolution of the other spring.

3. In a bed spring, a body composed of vertical coiled springs arranged side by side, the upper convolution of each of certain outermost springs being connected to the upper convolution of an adjacent inner spring by an arm integral with one of said convolutions and fastened to the other of said convolutions, and yielding, resilient cross connections between each spring within the space surrounded by the outermost springs and adjacent springs.

4. In a bed spring, a body composed of vertical coiled springs arranged side by side, yielding, resilient cross connections between said springs, and a connection between the upper convolution of each of certain outermost springs and the upper convolution of an adjacent inner spring consisting of an arm integral with one of the said convolutions and fastened at its free end to the other of said convolutions.

5. In a bed spring, a body composed of vertical coiled springs arranged side by side and consisting of a peripheral line of springs surrounding the remainder thereof, resilient cross connections between the springs, and special connections between springs of the outer line and the adjacent inner springs, said special connections each consisting of an arm integral with the upper convolution of one spring and attached at its free end to the upper convolution of the other spring.

6. In a bed spring, a body composed of vertical coiled springs arranged side by side and consisting of a peripheral line of springs surrounding the remainder thereof, a light frame surrounding said body in about the plane of and attached to the upper convolutions of the said outer line, resilient cross connections between said springs, and special connections between the outer line of springs and the adjacent inner springs, said special connections each consisting of an arm integral with the upper convolution of one spring and fastened at its free end to the other spring.

7. In a bed spring, a rectangular body of vertical coiled springs arranged side by side, a frame surrounding said body in about the plane of the upper convolutions of said springs and fastened to the upper convolutions of the outermost lines of springs, resilient cross connections between the springs, and connections between certain of the outer springs on each side of the rectangle and an adjacent inner spring, each of the latter connections consisting of an arm integral with the upper convolution of one spring and fastened to the upper convolution of the other spring.

8. In combination, two coiled springs having their upper convolutions in about the same plane, the upper convolution of one spring having the material thereof bent into a U-shaped arm passing over the second spring and bent downwardly within the upper convolution thereof, and a clip extending through the end of the loop in said arm underneath the upper convolution of said second spring and having hooks engaged with and partially surrounding the side members of said arm.

In testimony whereof, I sign this specification.

CARLYLE MacHARG.